(12) United States Patent
Suzuki et al.

(10) Patent No.: US 6,637,529 B2
(45) Date of Patent: Oct. 28, 2003

(54) STEERING CONTROL SYSTEM FOR TRACKLAYING VEHICLE

(75) Inventors: Kazuyuki Suzuki, Hirakata (JP); Shigeru Yamamoto, Hirakata (JP); Tomohiro Nakagawa, Hirakata (JP); Masahiro Ikeda, Osaka (JP)

(73) Assignee: Komatsu, Ltd., Tokyo (JP)

( * ) Notice: Subject to any disclaimer, the term of this patent is extended or adjusted under 35 U.S.C. 154(b) by 62 days.

(21) Appl. No.: 10/023,648

(22) Filed: Dec. 21, 2001

(65) Prior Publication Data

US 2002/0079144 A1 Jun. 27, 2002

(30) Foreign Application Priority Data

Dec. 25, 2000 (JP) ........................................ 2000-392986

(51) Int. Cl.[7] .............................................. B62D 11/08
(52) U.S. Cl. ........................ 180/6.7; 180/6.66; 180/9.44
(58) Field of Search ........................... 701/41; 180/6.7, 180/6.2, 6.48, 6.5, 6.66, 9.44; 172/4.5

(56) References Cited

U.S. PATENT DOCUMENTS

| 4,029,165 A | * 6/1977 | Miller et al. ................ 180/6.48 |
| 4,702,358 A | * 10/1987 | Mueller et al. ............. 192/13 R |
| 5,503,232 A | * 4/1996 | Matsushita et al. ............. 172/2 |
| 5,680,917 A | * 10/1997 | Bray ......................... 192/54.3 |
| 5,875,854 A | * 3/1999 | Yamamoto et al. .......... 172/4.5 |
| 6,141,613 A | * 10/2000 | Fan .............................. 701/50 |
| 6,260,642 B1 | 7/2001 | Yamamoto et al. .......... 180/6.7 |

FOREIGN PATENT DOCUMENTS

| JP | A-3-90484 | 4/1991 |
| JP | A-4-366232 | 12/1992 |
| JP | A-5-8753 | 1/1993 |
| JP | 7-329820 | * 12/1995 |
| JP | A-2000-177618 | 6/2000 |

* cited by examiner

*Primary Examiner*—Avraham Lerner
(74) *Attorney, Agent, or Firm*—Rader, Fishman & Grauer PLLC

(57) ABSTRACT

A steering control system for a tracklaying vehicle, which ensures smooth turning performance according to various modes such as ascent travel, descent travel, and travel in a low speed range and which provides improved controllability. According to various operation states such as an ascent travel state, descent travel state, high-load drive state, low engine rotational speed travel state, and high-speed travel state, the clutch/brake modulation characteristic (i.e., static or dynamic characteristic) is varied to select the optimum characteristic.

9 Claims, 13 Drawing Sheets

FIG. 3
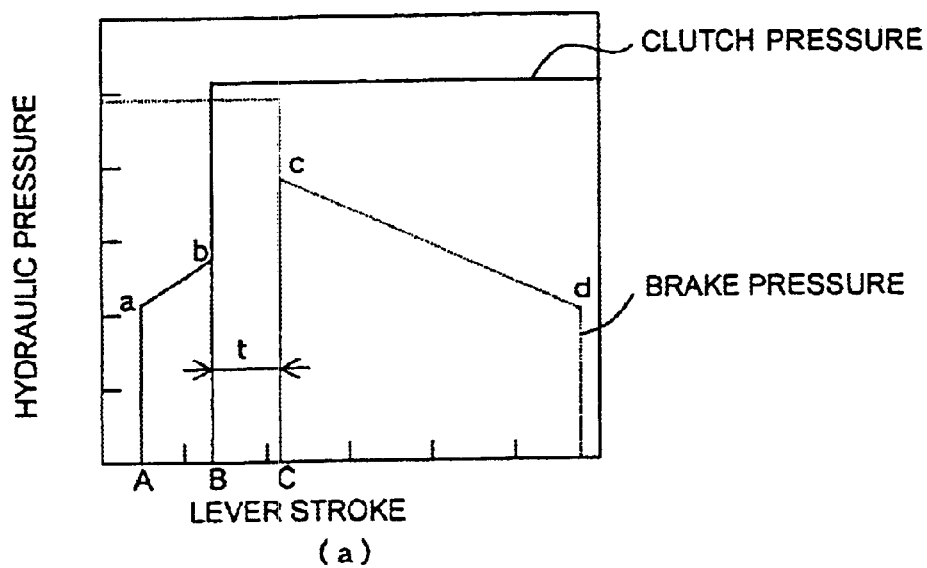
BASIC STEERING STATIC CHARACTERISTIC
(a)
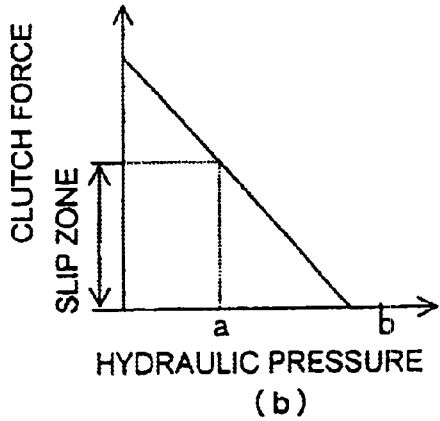
THE RELATIONSHIP BETWEEN CLUTCH FORCE AND HYDRAULIC PRESSURE
(b)
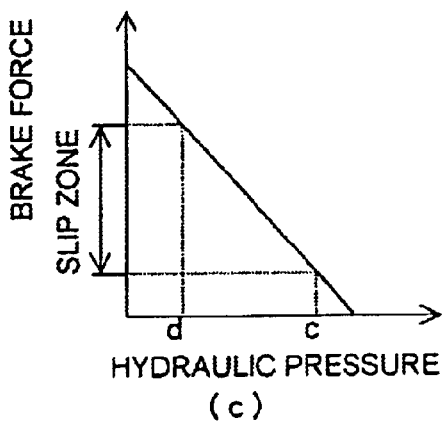
THE RELATIONSHIP BETWEEN BRAKE FORCE AND HYDRAULIC PRESSURE
(c)

FIG. 6     ASCNET TRAVEL STEERING STATIC CHARACTERISTIC
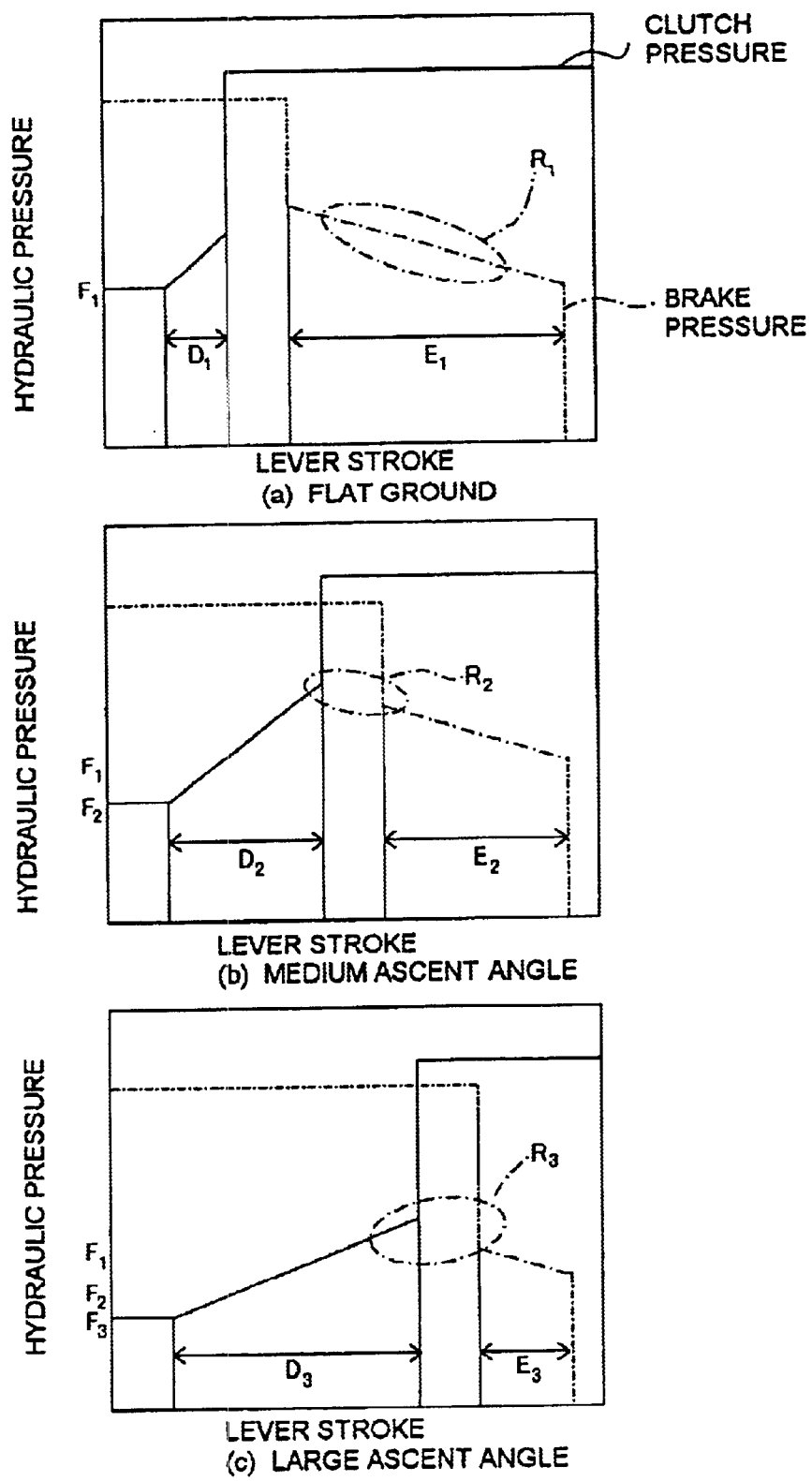

FIG. 7    DOZING STEERING STATIC CHARACTERISTIC
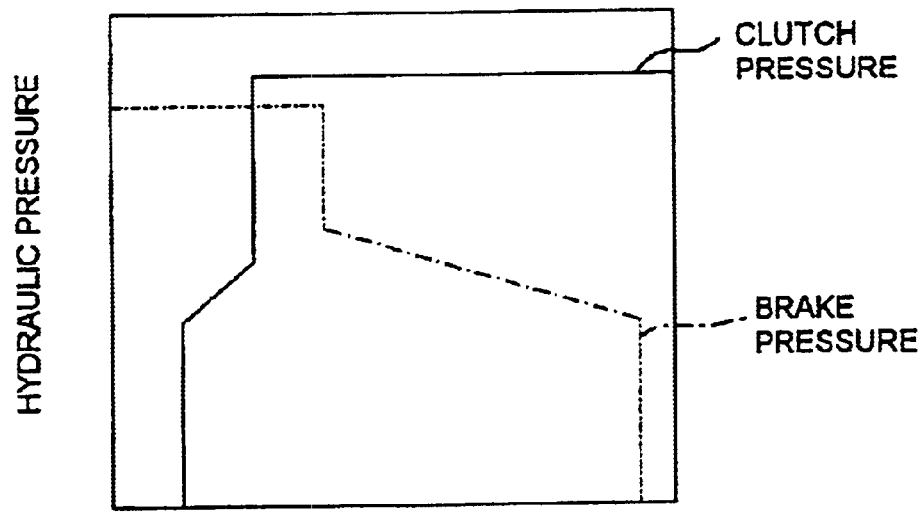
(a) NORMAL TRAVEL
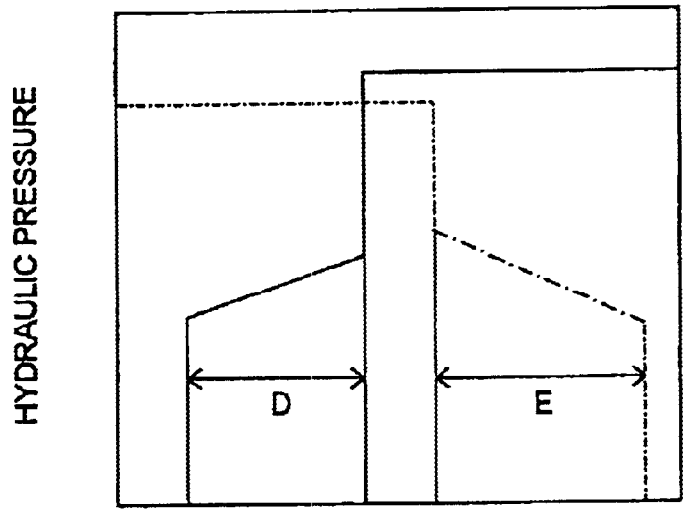
(b) DOZING FIG. 8    DESCENT STEERING STATIC CHARACTERISTIC
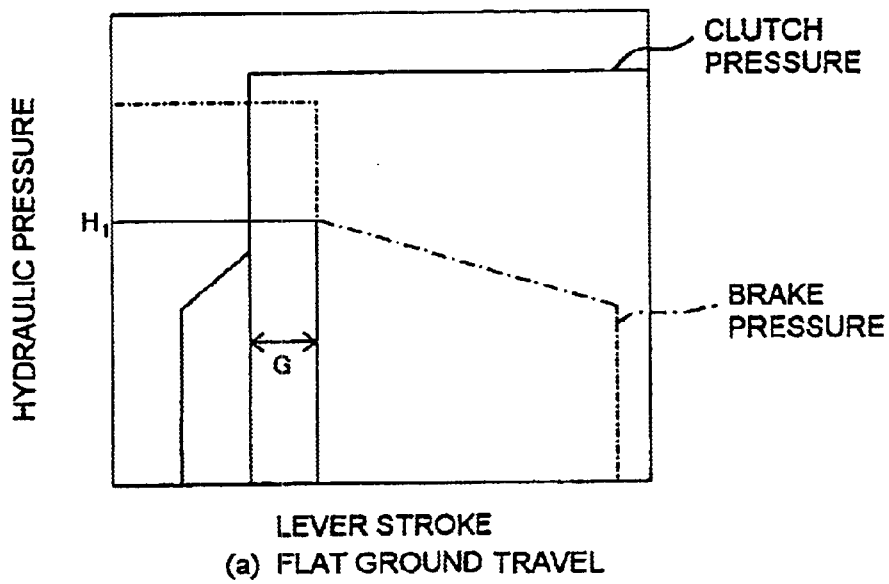
(a) FLAT GROUND TRAVEL
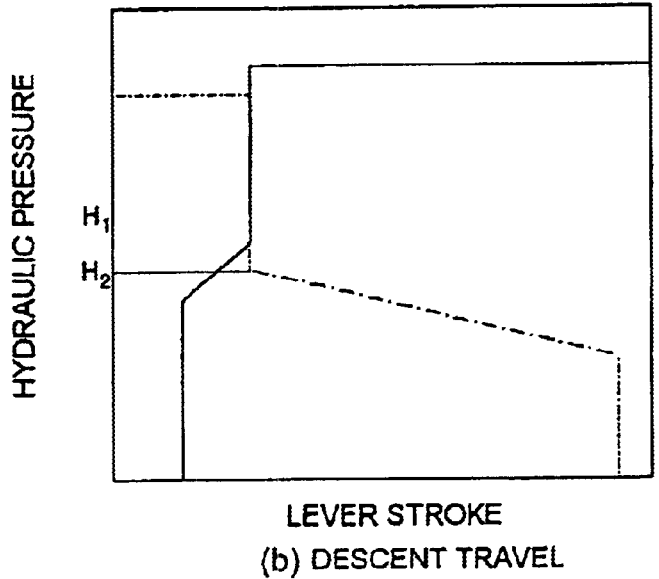
(b) DESCENT TRAVEL FIG. 10  LOW ENGINE SPEED STEERING STATIC CHARACTERISIC
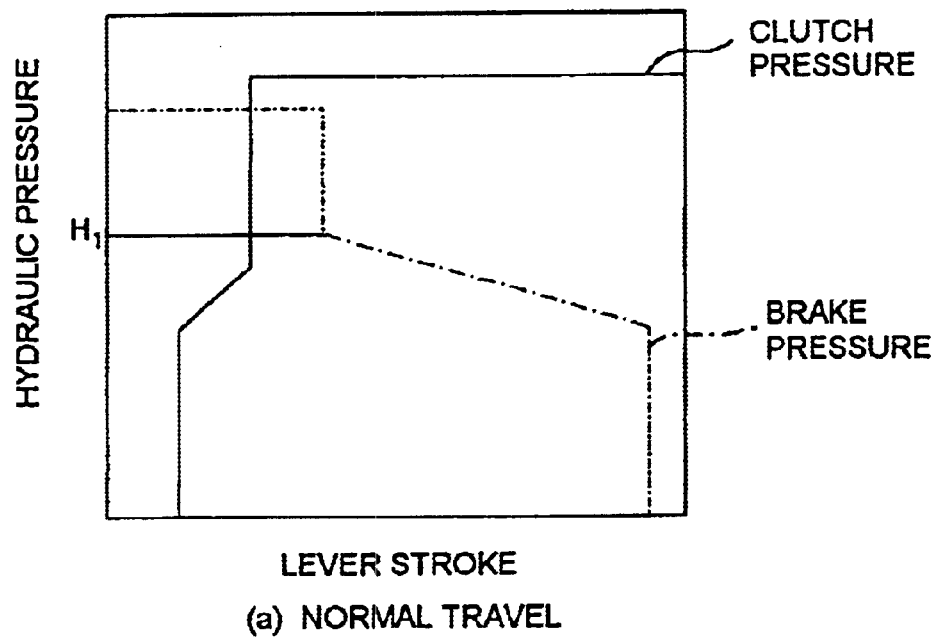
(a) NORMAL TRAVEL
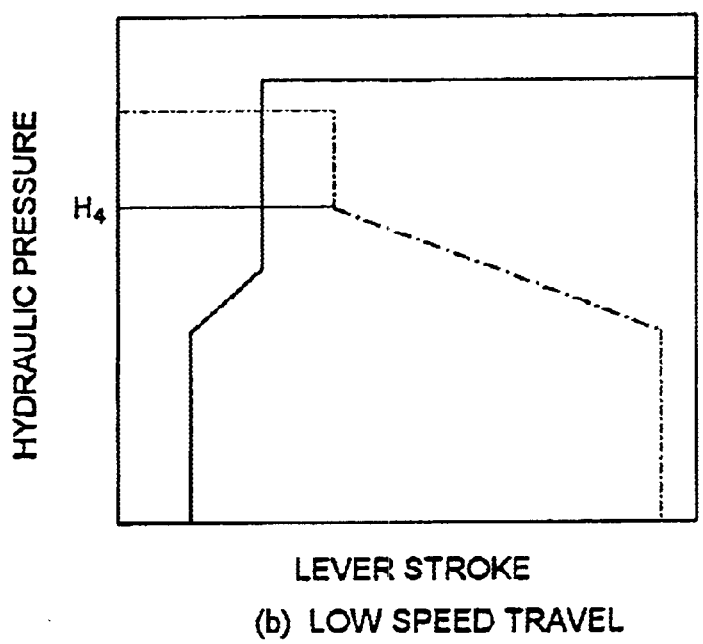
(b) LOW SPEED TRAVEL

FIG. 11
FIRST SPEED RANGE STEERING STATIC CHARACTERISTIC
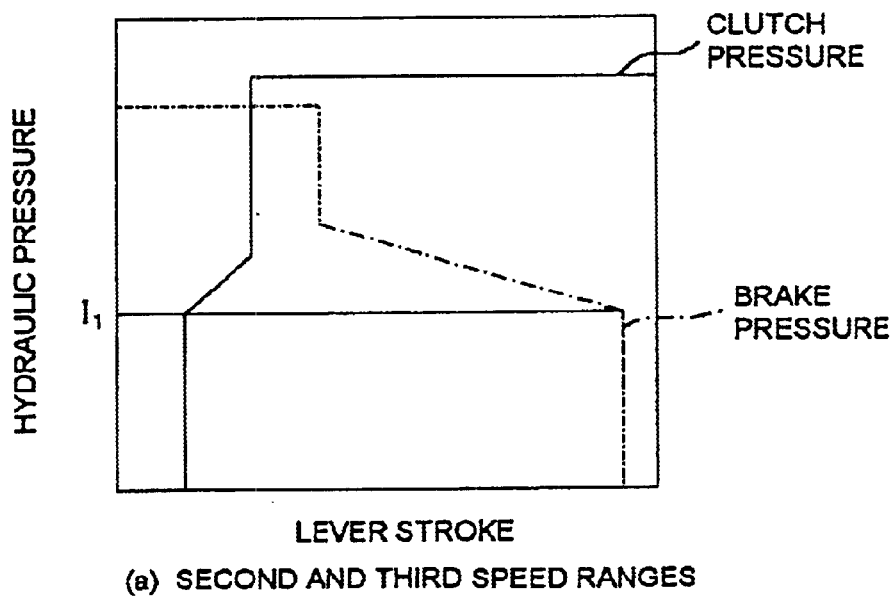
(a) SECOND AND THIRD SPEED RANGES
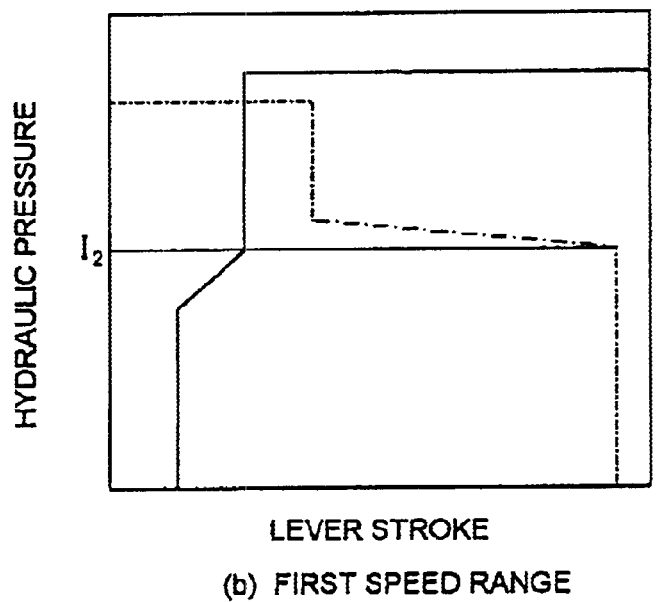
(b) FIRST SPEED RANGE

STEERING CONTROL SYSTEM FOR TRACKLAYING VEHICLE

TECHNICAL FIELD

The present invention relates to a steering control system for tracklaying vehicles such as, for instance, bulldozers.

BACKGROUND ART

There is known a steering control system for tracklaying vehicles such as bulldozers, in which a clutch and a brake are provided for each of the right and left driving wheels of the vehicle and controlled to make a right or left turn of the vehicle. In this steering control system, the steering lever is operated in a right or left steering direction during travel of the vehicle to release the clutch on the side, to which the steering lever has been operated, from its engaged state while the brake on the same side being actuated in a braking direction so that only the crawler belt on this side stops, whereby the vehicle turns in a desired direction.

The above-described steering control system is usually designed such that a specified period of time elapses after the clutch has been released until the brake is actuated, or alternatively, such that a specified period of time elapses after the brake has been released until the clutch is engaged, whereby shocks occurring during the steering control are mitigated to provide a smooth turn.

Such an arrangement, however, has presented the problem that if hydraulic pressure characteristics such as the time interval between clutch disengagement and brake engagement or between brake disengagement and clutch engagement, the hydraulic pressure at the start of brake engagement and the hydraulic pressure at the start of clutch disengagement, are made to be constant at all times, the optimum clutch and brake control for the respective bulldozer's operation states (e.g., dozing, slope traveling and operation at low engine rotational speed) cannot be performed.

As an attempt to solve the above problem, the present applicant has previously proposed a steering control system for tracklaying vehicles in Japanese Patent Application No. 2000-177618 according to which, with the aim of achieving steering performance optimum for each of the various operating conditions of a tracklaying vehicle, the clutch/brake modulation characteristic is varied according to, for example, "high-load drive state", "slope travel state", "low engine rotational speed state" and "high-speed travel state".

In the steering control system disclosed in the prior application, there are still remained the following drawbacks to be remedied.

(1) If the vehicle tries to make a turn during ascent travel, disengagement of the clutch on the side to which the steering lever has been operated causes the crawler belt on the same side to move, descending the slope because of its own weight. This leads to the so-called counterrotation phenomenon, that is, a turn of the vehicle on the spot in the direction in which the steering lever has been operated.

(2) Since the control for preventing a turn in a reverse direction (i.e., reverse steering) during the vehicle's descent travel has priority over the control in the dozing operation state (forward drive with a great tractive force being exerted), if dozing operation is carried out during descent travel, turning hydraulic pressure becomes high at the time of a turn during the dozing operation, resulting in an abrupt turn.

(3) The break hydraulic pressure required for a turning movement becomes high when the engine comes into its low rotational speed state during descent travel of the vehicle. Therefore, if the control for normal descent travel is performed, a shock will occur while the vehicle is turning.

(4) When a low speed range is selected during travel of the vehicle, turn control ability deteriorates owing to the change in brake hydraulic pressure.

The present invention is directed to overcoming the foregoing problems and a primary object of the invention is therefore to provide a steering control system for a tracklaying vehicle, which provides smooth turning performance according to various modes such as an ascent travel mode, descent travel mode and low speed range travel mode and which provides improved controllability.

DISCLOSURE OF THE INVENTION

The above object can be accomplished by a first aspect of the invention according to which, there is provided a steering control system for a tracklaying vehicle, which has a clutch and brake provided for each of right and left driving wheels, electronic proportional control valves for controlling the clutches and brakes, a steering lever, a steering command signal generator for generating a steering command signal according to the operation amount of the steering lever, and a controller for issuing a steering control signal to one of the electronic proportional control valves in response to an output from the steering command signal generator, which further comprises pitch angle detecting means for detecting the pitch angle of the vehicle inclining back and forth, and wherein if it is determined by the pitch angle detecting means that the vehicle is in an ascent travel state, the controller outputs a steering control signal to one of the electronic proportional control valves to obtain a hydraulic pressure characteristic which makes the range of a clutch holding zone wider than that employed when the vehicle is in a flat ground travel state.

According to the first aspect of the invention, the range of the clutch holding zone during ascent travel is made to be wider than that employed during flat ground travel and, in accordance with this, the range of the brake holding zone is narrowed, so that the hydraulic pressure zone at the time of turning can be shifted to the side of the clutch holding zone. Accordingly, the value of the turning torque for the inner crawler belt at the time of turning becomes plus so that a half-clutch state continues for a long time, preventing an occurrence of the counterrotation phenomenon caused by disengagement of the clutch for the inner crawler belt. As a result, improved turning controllability can be achieved.

Preferably, the invention is arranged such that, if it is determined by the pitch angle detecting means that the vehicle is in its ascent travel state, the controller outputs a steering control signal to one of the electronic proportional control valves to obtain a hydraulic pressure characteristic which makes the lower limit of hydraulic pressure at the time of clutch disengagement lower than that employed when the vehicle is in the flat ground travel state. Since the lower limit of hydraulic pressure at the time of clutch disengagement, that is, clutch disengagement starting hydraulic pressure becomes low when the vehicle ascends, improved turning controllability can be achieved by using a hydraulic pressure characteristic suited for the low lower limit of hydraulic pressure.

Preferably, in the invention, a plurality of kinds of characteristic diagrams, each of which step-wise varies for every hydraulic pressure characteristic, are prepared and a desired characteristic diagram is selected from them. By virtue of this arrangement, a turning characteristic suited for each condition can be selected so that the optimum control performance can be constantly achieved.

According to a second aspect of the invention, there is provided a steering control system for a tracklaying vehicle, which has a clutch and brake provided for each of right and left driving wheels, electronic proportional control valves for controlling the clutches and brakes, a steering lever, a steering command signal generator for generating a steering command signal according to the operation amount of the steering lever, and a controller for issuing a steering control signal to one of the electronic proportional control valves in response to an output from the steering command signal generator, which further comprises tractive force detecting means for detecting the tractive force of the vehicle and pitch angle detecting means for detecting the pitch angle of the vehicle inclining back and forth, and wherein if it is determined by the tractive force detecting means and the pitch angle detecting means that the vehicle is not in a high-load drive state but in a descent travel state, the controller outputs a steering control signal to one of the electronic proportional control valves to obtain a hydraulic pressure characteristic which eliminates a zone in which a clutch and a brake are released at the same time and sets the upper limit of hydraulic pressure at the time of brake engagement to a first value, the first value being lower than the upper limit of hydraulic pressure when the vehicle is in a flat ground travel state.

According to the second aspect of the invention, when the vehicle is in a descent travel state, control is effected such that there is no zone where a clutch and a brake are released at the same time, in other words, the braking force of the brake is increased while the clutch disengagement zone being eliminated, so that the reverse-directional turning (reverse steering) phenomenon can be positively avoided during descent travel by disengagement of the clutch and shock-free turning performance can ensured. In addition, since a dozing steering mode has priority over a descent steering mode, an abrupt turn of the vehicle can be prevented, this abrupt turn being caused by an increase in turning hydraulic pressure when the vehicle turns for dozing operation during descent travel.

Preferably, the steering control system of the invention further comprises rotation detecting means for detecting the rotation of an engine, and if it is determined by the rotation detecting means that the engine is in its low rotational speed state, the controller outputs a steering control signal to one of the electronic proportional control valves to obtain a hydraulic pressure characteristic which sets the upper limit of hydraulic pressure at the time of brake engagement to a second value, the second value being lower than the upper limit of hydraulic pressure when the vehicle is in the flat ground travel state and higher than the first value. With this arrangement, even if the rotational speed of the engine drops during descent travel, the upper limit of hydraulic pressure at the time of brake engagement is corrected to a higher value than the upper limit of hydraulic pressure during normal descent travel, reducing breaking force, so that a shock caused by a turn is mitigated and turning controllability is improved.

In the invention, it is preferable to prepare a plurality of characteristic diagrams each of which stepwise varies for every hydraulic pressure characteristic and to select a desired characteristic diagram from them. This enables selection of a turning characteristic suited for each condition to constantly obtain the optimum control performance.

According to a third aspect of the invention, there is provided a steering control system for a tracklaying vehicle, which has a clutch and brake provided for each of right and left driving wheels, electronic proportional control valves for controlling the clutches and brakes, a steering lever, a steering command signal generator for generating a steering command signal according to the operation amount of the steering lever, and a controller for issuing a steering control signal to one of the electronic proportional control valves in response to an output from the steering command signal generator, which further comprises speed range detecting means for detecting the speed range of a transmission, and wherein if it is determined by the speed range detecting means that the transmission is placed in a low speed range, the controller outputs a steering control signal to one of the electronic proportional control valves to obtain a hydraulic pressure characteristic which sets the rate of change of hydraulic pressure with respect to lever stroke when hydraulic pressure changes from its upper limit to its lower limit at the time of brake engagement to a low value.

According to the third aspect of the invention, since control is made such that the rate of change of hydraulic pressure for lever stroke when hydraulic pressure changes from its upper limit to its lower limit during brake engagement decreases as the transmission is shifted to a lower speed range, the effective lever stroke zone when the transmission is placed in a low speed range can be expanded to achieve smooth turning performance.

In the invention, it is preferable to set the rate of change of hydraulic pressure to a low value by setting the lower limit of hydraulic pressure when the transmission is placed in a low speed range to a value higher than the lower limit of hydraulic pressure when the transmission is in a high speed range.

In the invention, it is also preferable to prepare a plurality of characteristic diagrams each of which stepwise varies for every hydraulic pressure characteristic and to select a desired characteristic diagram from them. This enables selection of a turning characteristic suited for each condition to constantly obtain the optimum control performance.

BRIEF DESCRIPTION OF THE DRAWINGS

FIGS. 3(a), 3(b) and 3(c) are a clutch/brake modulation characteristic graph; a graph of clutch force versus hydraulic pressure; and a graph of brake force versus hydraulic pressure, respectively.

FIGS. 6(a) to 6(c) are graphs showing, for comparison purpose, steering hydraulic pressure static characteristic diagrams for flat ground travel, for ascent travel with a medium ascent angle and for ascent travel with a large ascent angle, respectively.

FIGS. 7(a) and 7(b) are graphs showing, for comparison purpose, steering hydraulic pressure static characteristic diagrams for normal travel and for dozing, respectively.

FIGS. 8(a) and 8(b) are graphs showing, for comparison purpose, steering hydraulic pressure static characteristic diagrams for flat ground travel and for descent travel, respectively.

FIGS. 10(a) and 10(b) are graphs showing, for comparison purpose, steering hydraulic pressure static characteristic diagrams for normal travel and for low speed travel, respectively.

FIGS. 11(a) and 11(b) are graphs showing, for comparison purpose, steering hydraulic pressure static characteristic diagrams for second and third speed ranges and for a first speed range, respectively.

BEST MODE FOR CARRYING OUT THE INVENTION

Referring now to the accompanying drawings, the steering control system for a tracklaying vehicle of the invention will be described according to a preferred embodiment.

Figure 1:
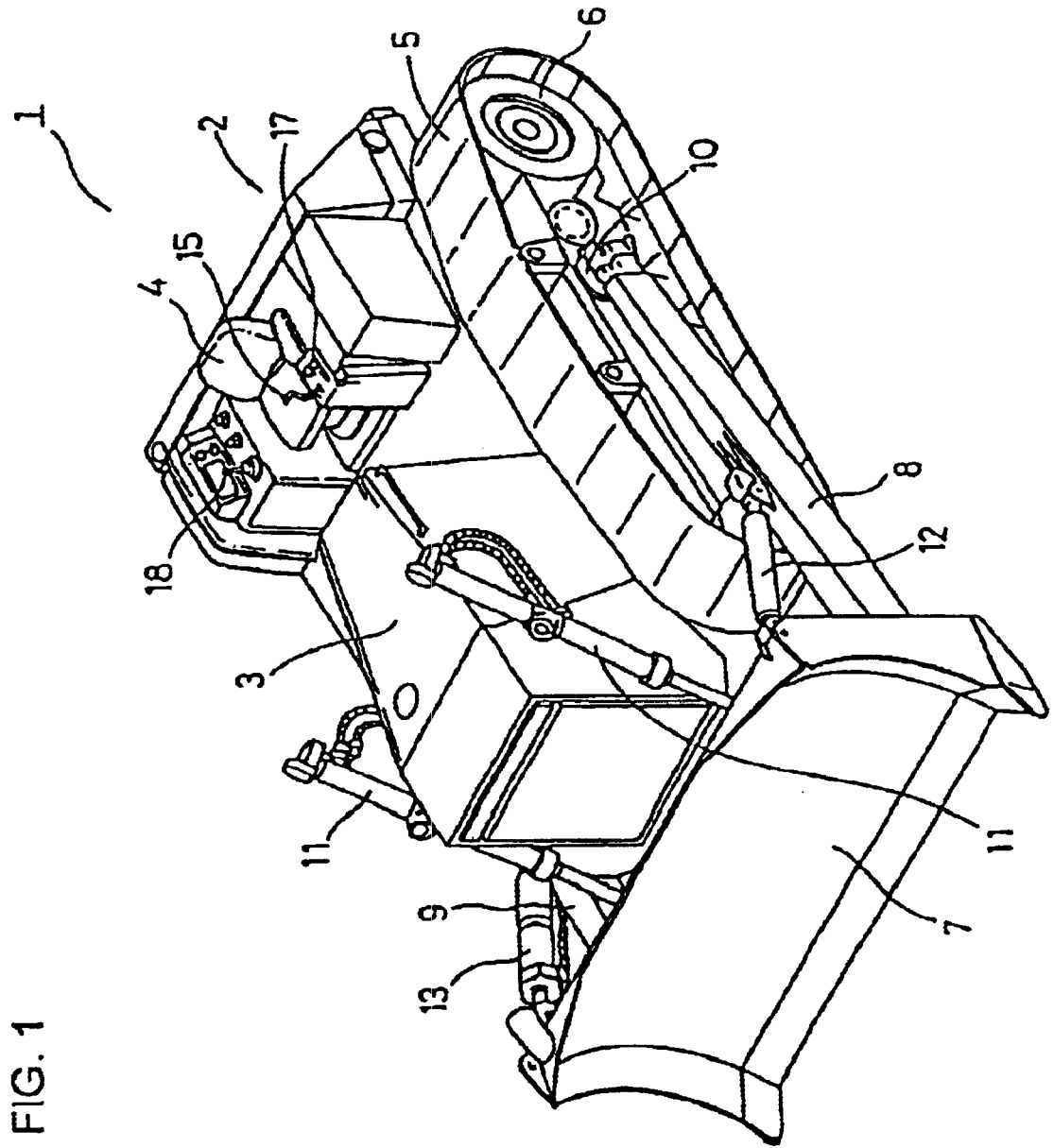
FIG. 1 shows an external appearance of a bulldozer constructed according to one embodiment of the invention.

There will be hereinafter explained an embodiment in which the invention is applied to a bulldozer. FIG. 1 shows the external appearance of a bulldozer constructed according to one embodiment of the invention.

In the bulldozer 1 of the present embodiment, there are provided a bonnet 3 and a cab 4 on a vehicle body 2. Disposed on both right and left sides of the vehicle body 2 when viewed in the forward driving direction of the vehicle body 2 are crawler belts 5 for driving the vehicle body 2 so as to travel forwardly and reversely and turn. The crawler belts 5 are respectively independently driven by a driving force transmitted from an engine with the aid of their associated sprockets 6.

A blade 7 is supported at the distal ends of right and left straight frames 8, 9 the proximal ends of which are, in turn, pivotally supported at the right and left sides of the vehicle body 2 through trunnions 10 (the trunnion on the right side is not shown in the drawing) such that the blade 7 can be raised or lowered. A right and left pair of blade lift cylinders 11 are arranged between the blade 7 and the vehicle body 2, for raising or lowering the blade 7. A brace 12 and a blade tilt cylinder 13 are provided for laterally tilting the blade 7, the former being positioned between the left straight frame 8 and the blade 7 and the latter being positioned between the right straight frame 9 and the blade 7.

Positioned on the left side of the cab 4 are (i) a steering lever 15 which also serves as a gear change lever for selecting forward and reverse drives and (ii) a fuel control lever 17. On the right side of the cab 4, there is provided a blade control lever 18 or the like for raising, lowering, left-tilting and right-tilting the blade 7. Although not shown in the drawing, there is provided a decelerator pedal in front of the cab 4.

Figure 2:
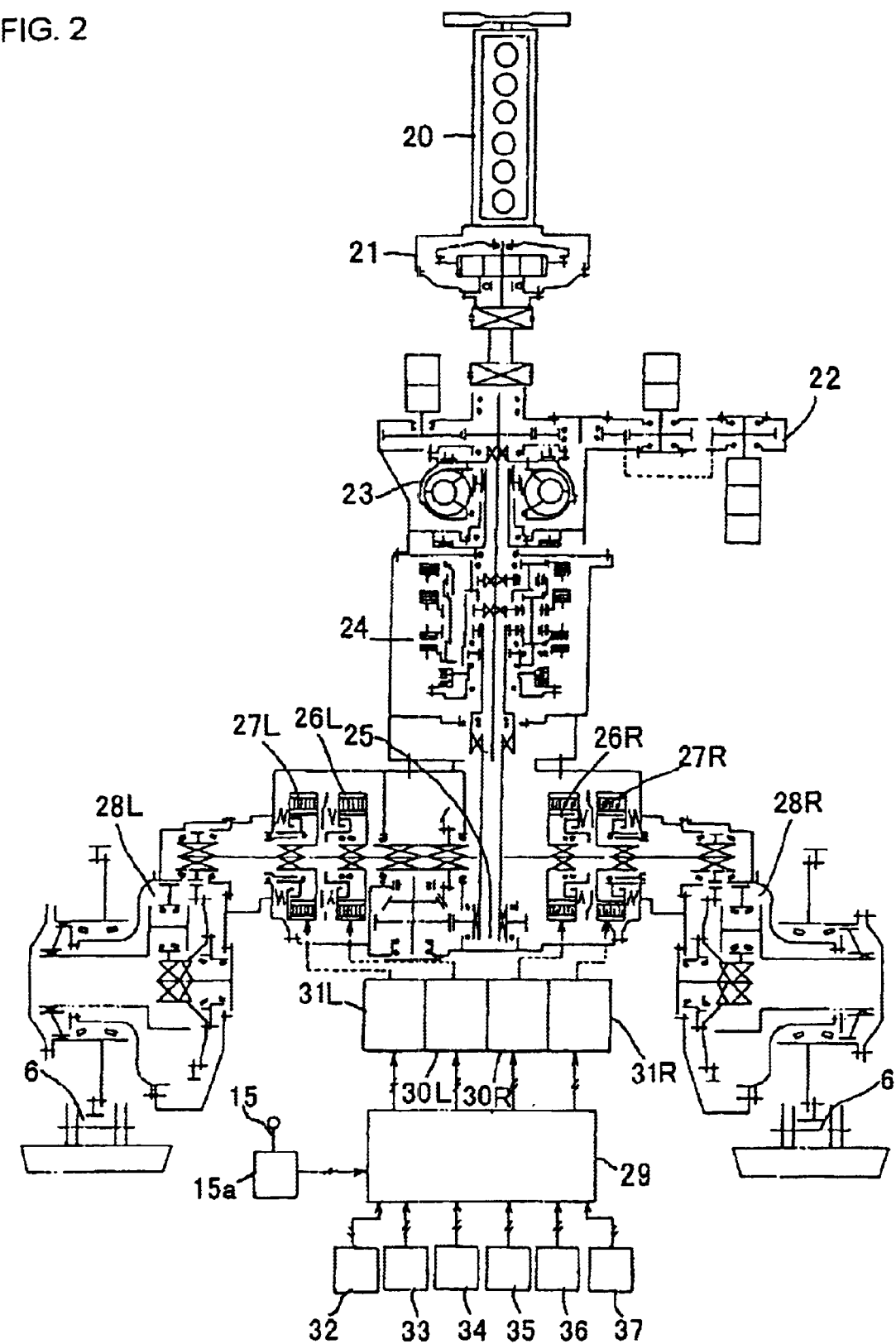
FIG. 2 is a system structural diagram according to the embodiment.

Referring to FIG. 2 which shows the system configuration of the present embodiment, the rotary driving force of an engine 20 is transmitted to a torque converter 23 through a damper 21 and a PTO 22. Thereafter, the rotary driving force is transmitted from the output shaft of the torque converter 23 to a transmission 24 which is, for example, a planetary gear wet-type multi-plate clutch transmission whose input shaft is connected to the output shaft of the torque converter 23. The transmission 24 has forward and reverse drive clutches and first to third speed clutches. The rotary driving force is then transmitted from the output shaft of the transmission 24 to a right and left pair of a final reduction gears 28R, 28L via a transfer 25; right and left steering clutches 26R, 26L; and right and left brakes 27R, 27L, so that the sprockets 6 are respectively actuated for running the crawler belts 5.

The clutches 26R, 26L and the brakes 27R, 27L are designed to be actuated by the energizing force of springs and released by hydraulic pressure and controlled by a right clutch solenoid proportional control valve 30R, a left clutch solenoid proportional control valve 30L, a right brake solenoid proportional control valve 31R and a left brake solenoid proportional control valve 31L, respectively, in response to a control signal output from a controller 29. To effect this control, the controller 29 inputs a signal from a steering command signal generator 15a which issues a steering command signal according to the operation amount of the steering lever 15. The controller 29 also inputs other data such as (i) rotational speed data on the engine 20 from an engine rotation sensor 32; (ii) rotational speed data on the output shaft of the torque converter 23 from a torque converter output shaft rotation sensor 33; (iii) pitch angle data on the inclination of the vehicle in a forward or backward direction from a pitch angle sensor (pitch angle detecting means) 34; (iv) rotational speed data on the output shaft of the transmission 24 from a transmission output shaft rotation sensor 35; (v) data on the speed range condition of the transmission 24 from a transmission speed range sensor (speed range detecting means) 36; and (vi) data on the throttle amount of the engine 20 from a throttle sensor (rotation detecting means) 37.

FIG. 3(a) (modulation characteristic graph) shows the relationship between the stroke of the steering lever 15 and brake hydraulic pressure (holding pressure) when the bulldozer is in a normal travel state. FIGS. 3(b) and 3(c) show the relationship between clutch force and hydraulic pressure and the relationship between brake force and hydraulic pressure, respectively. With reference to these graphs, the characteristics of clutch pressure and brake pressure control by operation of the steering lever 15 will be described below.

As shown in FIG. 3(a), at first, both of the clutches are not supplied with pressure oil and therefore they are in their ON state owing to the energizing force of the springs, while the brakes are provided with pressure oil, being in their OFF state so that the vehicle runs straight ahead. Upon operation of the steering lever 15, pressure oil is supplied to a clutch at Point A to increase hydraulic pressure to Point a from which engagement force is gradually decreased toward Point b and clutch force is turned OFF slightly before Point b (see FIG. 3(b)). Regarding the associated brake, pressure oil is withdrawn from the brake thereby decreasing hydraulic pressure to Point c and then, brake force is gradually increased from Point c toward Point d at which the brake is engaged (see FIG. 3(c)). In this case, a delay time t is present between Point b and Point c and the brake is designed to be brought into its ON state after the clutch has been brought into its OFF state. On the other hand, in the case of "brake•OFF→clutch•ON", a delay time is set such that the clutch is brought into the ON state after the brake has been brought into the OFF state. With this arrangement, shocks occurring during the operation can be prevented.

Figure 4:
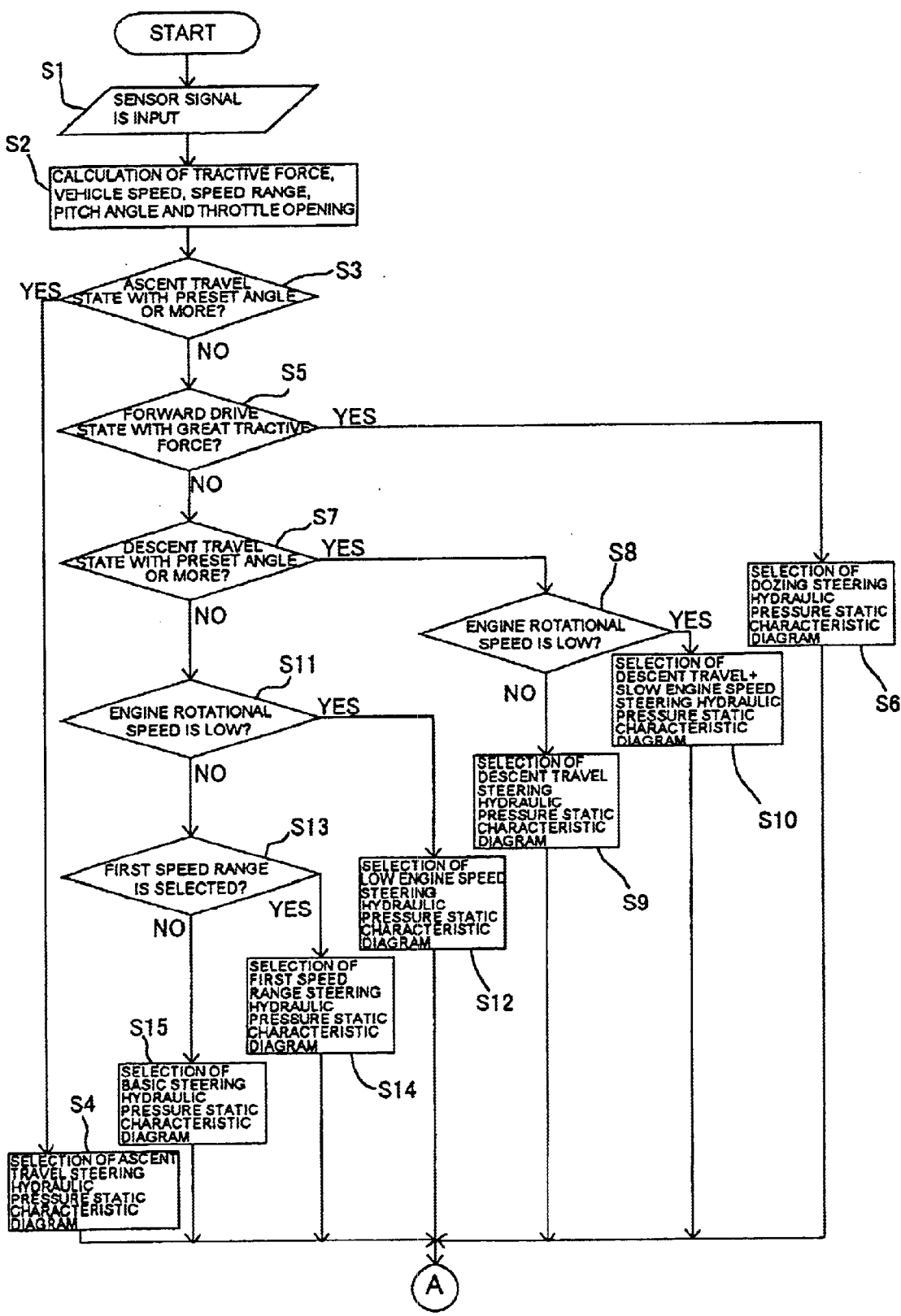
FIG. 4 is a flow chart showing the first half of a process of steering control.
Figure 5:
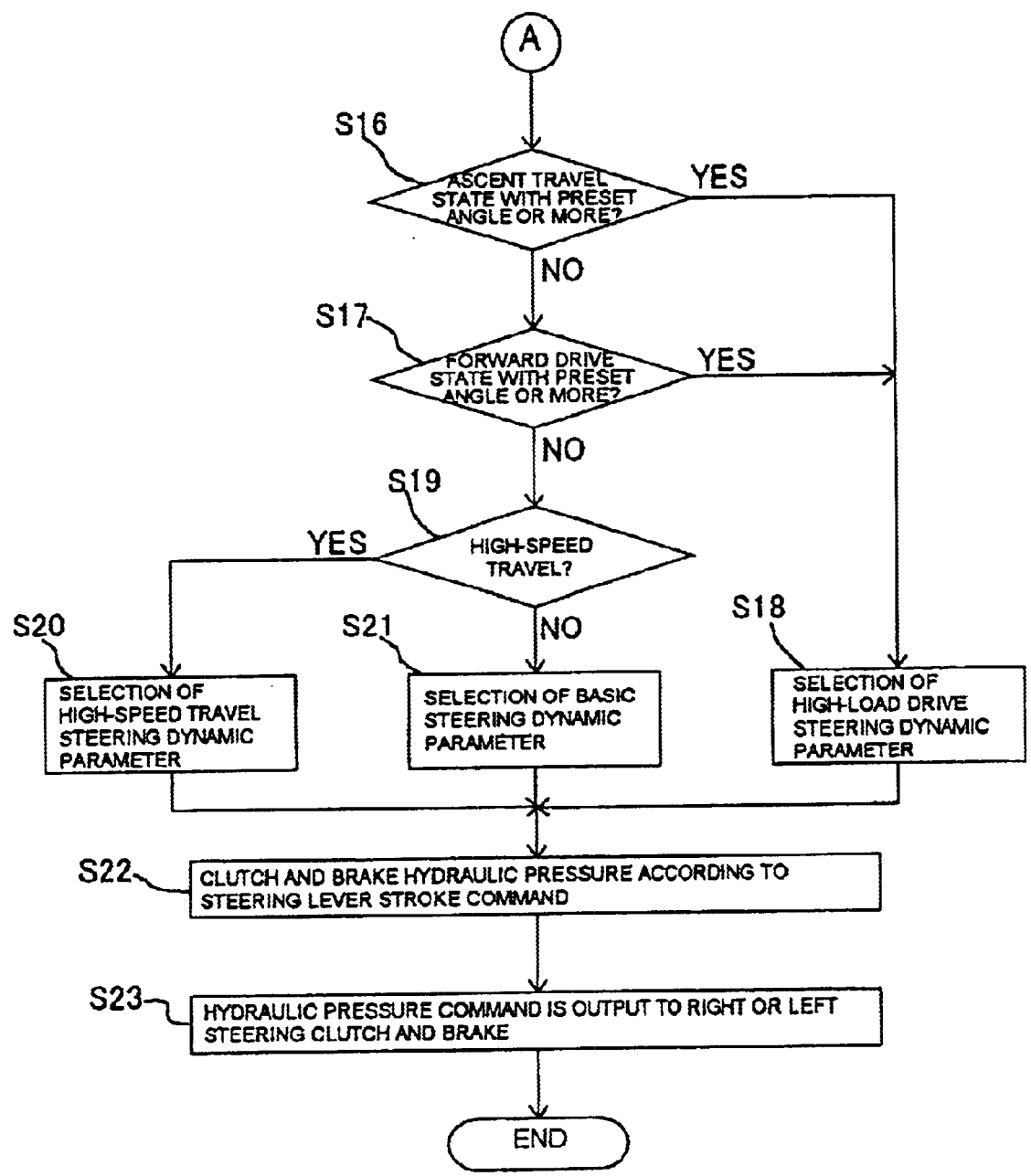
FIG. 5 is a flow chart showing the second half of the process of steering control.

In the present embodiment, steering control is effected such that the hydraulic pressure characteristic (static and dynamic characteristics) of the bulldozer change according to the operation state of the bulldozer in relation to the above-described clutch/brake hydraulic pressure characteristic (static characteristic) for normal travel. The steeling control of the present embodiment will be concretely described below with reference to the flow charts of FIGS. 4 and 5.

Step S1 to Step S2: In addition to a steering lever stroke signal issued from the steering command signal generator 15a, the controller 29 inputs other sensor signals such as: (i) rotational speed data on the engine 20 from the engine rotation sensor 32; (ii) a rotational speed signal on the output shaft of the torque converter 23 from the torque converter output shaft rotation sensor 33; (iii) pitch angle data on the inclination of the vehicle in a forward or backward direction from the pitch angle sensor 34; (iv) rotational speed data on the output shaft of the transmission 24 from the transmission output shaft rotation sensor 35; (v) speed range data from the transmission speed range sensor 36; and (vi) throttle amount data on the engine 20 from the throttle sensor 37. Then, the tractive force of the vehicle is calculated from the rotational speed data on the engine 20 and the rotational speed data on the output shaft of the torque converter 23. The pitch angle of the vehicle is calculated from the pitch angle data while vehicle speed is calculated from the rotational speed data on the output shaft of the transmission 24.

Step S3: A check is made to determine from the pitch angle thus calculated if the vehicle is in an ascent travel state, with an ascent angle equal to or more than a preset angle (e.g., 6 degrees).

Step S4: If it is determined that the vehicle is in the ascent travel state with an ascent angle equal to or more than the preset angle, a steering hydraulic pressure static characteristic diagram for ascent travel is selected as the clutch/brake modulation characteristic. As seen from FIGS. 6(b) and 6(c), this steering hydraulic pressure static characteristic diagram for ascent travel has a widened range $D_2$ or $D_3$ of a clutch holding zone (with a narrowed range $E_2$ or $E_3$ of a brake holding zone), compared to the hydraulic pressure diagram for flat ground travel (see FIG. 6(a)). In addition, the lower limit $F_2$ or $F_3$ of hydraulic pressure at the time of clutch disengagement (i.e., clutch disengagement starting hydraulic pressure) for ascent travel is set to a value lower than the lower limit $F_1$ of hydraulic pressure for flat ground travel. In this case, there are prepared a plurality of steering hydraulic pressure static characteristic diagrams having different clutch holding zone ranges which differ according to the magnitudes of ascent angles and the optimum characteristic diagram corresponding to the magnitude of the current ascent angle of the vehicle is selected from them. By selecting one from the plurality of hydraulic pressure characteristic diagrams, a hydraulic pressure zone $R_1$ for turning operation, which is on the side of a brake holding zone when the vehicle is in the flat ground travel state, is shifted to the side of the clutch holding zone as indicated by Codes $R_2$ and $R_3$ with increases in the ascent angle of the vehicle. In this way, the turning torque of the inner crawler belt at the time of turning has a plus value, so that the half-clutch state continues for a long time. As a result, the counterrotation phenomenon caused by disengagement of the clutch for the inner crawler belt during ascent travel can be prevented. Further, since the lower limit value of hydraulic pressure at the time of clutch disengagement becomes a suitable value for ascent travel, improved turning controllability can be attained.

Step S5: If it is determined in the check of Step S3 that the vehicle is not in the ascent travel state with an ascent angle equal to or more than the preset angle, it is then determined from the calculated tractive force of the vehicle whether or not the vehicle is in a forward drive state, exerting a great tractive force (i.e., dozing operation state).

Step S6: In view of the fact that where the vehicle is in the high-load forward drive state with a tractive force equal to or more than a specified value (e.g., 0.4W (W=the weight of the vehicle)), the value of the torque required for the inner crawler belt at the time of turning is plus, a steering hydraulic pressure static characteristic diagram for dozing is selected as the clutch/brake modulation characteristic. The steering hydraulic pressure static characteristic diagram for dozing is such that, as shown in FIG. 7(b), the range D of the clutch holding zone is widened and the range E of the brake holding zone is narrowed, compared to the characteristic diagram for normal travel (see FIG. 7(a)). In other words, the characteristic diagram for dozing is such that Points b and c shown in FIG. 3(a) are shifted to the right. Accordingly, the value of the turning torque for the inner crawler belt when the vehicle makes a turn becomes plus and the half-clutch state continues for a long time, so that pushing and passing of soil from the front face of the blade can be smoothly carried out even during dozing operation. As a result, the optimum turning characteristic free from shocks can be achieved. It should be noted that there are prepared a plurality of steering hydraulic pressure static characteristic diagrams for dozing having different clutch holding zone ranges which differ according to the magnitudes of tractive force and the optimum characteristic diagram corresponding to the magnitude of the current tractive force is selected from them.

Step S7: If it is determined in the check of Step S5 that the vehicle is not in the forward drive state with great tractive force, it is then determined from the calculated pitch angle whether the vehicle is in a descent travel state, with a descent angle equal to or more than a preset angle (e.g., 6 degrees).

Step S8: If the vehicle is in the descent travel state with a descent angle equal to or more than the preset angle, it is then determined from the opening of the throttle whether the rotational speed of the engine is low.

Step S9: If the vehicle is in the descent travel state with a descent angle equal to or more than the preset angle and the rotational speed of the engine is not low, a steering hydraulic pressure static characteristic diagram for descent travel is selected as the clutch/brake modulation characteristic in view of the fact that the turning torque required for the inner crawler belt at the time of turning has a great minus value. As seen from FIG. 8(b), this steering hydraulic pressure static characteristic diagram for descent travel is designed such that brake control is speeded up compared to the characteristic for flat ground travel (see FIG. 8(a)), that the zone (idling zone) G where the clutch and the brake are released at the same time is eliminated, and that the upper limit $H_2$ of hydraulic pressure at the time of brake engagement is set to a lower value (first preset value) than the upper limit $H_1$ of hydraulic pressure for the flat ground travel. By selecting such a hydraulic pressure characteristic, control is effected in such a way that the clutch disengagement zone is eliminated and brake force is increased so that a reverse turn (the reverse steering phenomenon) due to clutch disengagement during descent travel can be prevented. In addition, since the upper limit $H_2$ of hydraulic pressure at the time of brake engagement is set to a lower value, the force of the brake is corrected so as to increase so that when descending a slope, the vehicle can be steered with the same steering feeling as in travelling on the flat ground. Similarly to the foregoing, there are prepared a plurality of steering hydraulic pressure static characteristic diagrams for descent travel which have different upper limits of hydraulic pressure at the time of brake disengagement, the upper limits differing according to the magnitudes of descent angles. And, the optimum characteristic diagram corresponding to the magnitude of the current descent angle of the vehicle is selected from them. It should be noted that the larger the descent angle is, the smaller the value of the upper limit $H_2$ of hydraulic pressure becomes.

Figure 9:
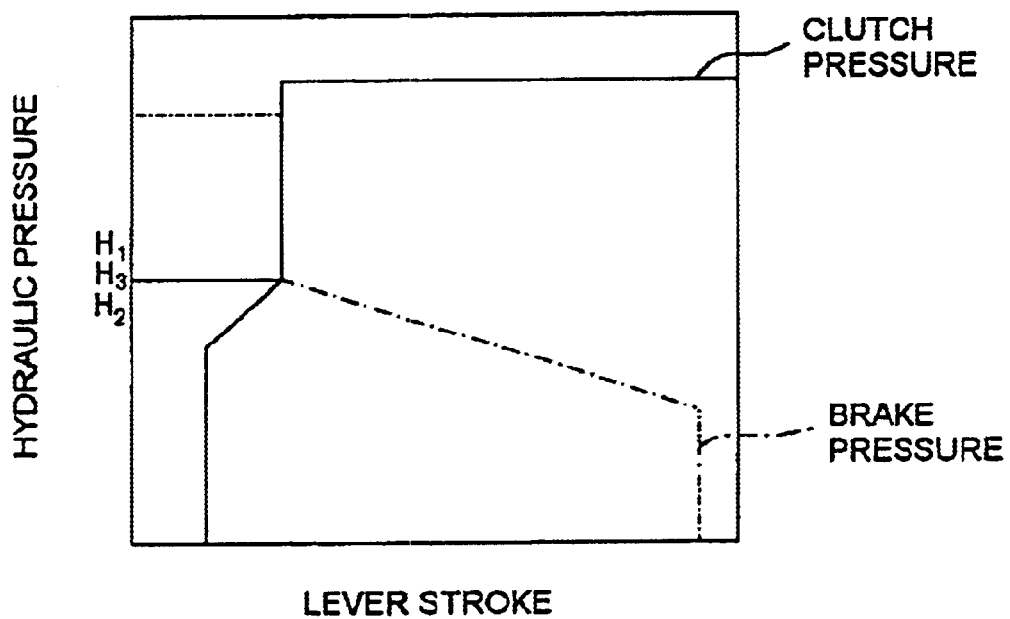
FIG. 9 is a graph showing a steering hydraulic pressure static characteristic diagram for descent travel plus slow engine speed.

Step S10: If the vehicle is in the descent travel state with a descent angle equal to or more than the preset angle and the rotational speed of the engine is low, a steering hydraulic pressure static characteristic diagram for descent travel plus slow engine speed is selected as the clutch/brake modulation characteristic. The steering hydraulic pressure static characteristic diagram for descent travel plus slow engine speed is such that, as shown in FIG. 9, the upper limit of hydraulic pressure at the time of brake engagement is set to a second preset value $H_3$ that is lower than the preset value $H_1$ for flat ground travel and higher than the first preset value $H_2$. By selecting such a hydraulic pressure characteristic, the upper limit of hydraulic pressure at the time of brake engagement is corrected to a value higher than the upper limit of hydraulic pressure for the normal descent travel, with brake force weakened, so that shocks occurring when the vehicle makes a turn are reduced, leading to improved turning controllability.

Step S11: If it is determined in the check of Step S7 that the vehicle is not in the descent travel state with a descent angle equal to or more than the preset angle, it is then determined from the opening of the throttle whether or not the rotational speed of the engine is low.

Step S12: Since the turning torque when the engine rotates at low speed may be small, a steering hydraulic pressure static characteristic diagram for low engine speed as shown in FIG. 10(b) is selected. This steering hydraulic pressure static characteristic diagram for low engine speed is such that the upper limit $H_4$ of hydraulic pressure at the time of brake engagement is set to a value higher than the upper limit $H_1$ of hydraulic pressure for normal travel (see FIG. 10(a)), with brake force weakened. Accordingly, the quick brake characteristic enables fine steering control suited for fine operational control.

Step S13: On the other hand, if it is determined in the check of Step S11 that the engine does not rotate at low speed, it is then determined based on the speed range data sent from the transmission speed range sensor 36 whether or not the first speed range is selected.

Step S14: If the transmission is placed in the first speed range, a steering hydraulic pressure static characteristic diagram for the first speed range as shown in FIG. 11(b) is selected. This steering hydraulic pressure static characteristic diagram for the first speed range is such that the rate of change of hydraulic pressure with respect to lever stroke when hydraulic pressure changes from its upper limit to its lower limit at the time of brake engagement is set to a low value. More concretely, in this hydraulic pressure characteristic diagram, the lower limit $I_2$ of hydraulic pressure at the time of brake engagement when the first speed range is selected is higher than the lower limit $I_1$ of hydraulic pressure when the second or third speed range is selected. By virtue of the selection of such a hydraulic pressure characteristic, the pivot turn lever stroke when the first speed range is selected is substantially the same as that when the second or third speed range is selected, so that smooth turning controllability can be ensured.

While two kinds of hydraulic pressure characteristic diagrams (i.e., the characteristic diagram for the first speed range and the characteristic diagram for the second and third speed ranges) are used in the present embodiment, it is also possible to employ three hydraulic pressure characteristic diagrams which are arranged for the first speed range, for the second speed range, and for the third speed range, respectively. While the rate of change of hydraulic pressure from its upper limit to its lower limit at the time of brake engagement is made to be low by increasing the lower limit of hydraulic pressure at the time of brake engagement in the present embodiment, it may be done by lowering the upper limit of hydraulic pressure at the time of brake engagement.

Step S15: If the vehicle is not in the ascent travel state with an ascent angle equal to or more than the preset angle, nor in the high-load drive state with a tractive force equal to or more than the specified value, nor in the descent travel state with a descent angle equal to or more than the preset angle, and the rotational speed of the engine is not low and the first speed range is not selected, a basic steering hydraulic pressure static characteristic diagram as shown in FIG. 3(a) is selected.

Step S16: After one of the steering hydraulic pressure static characteristic diagrams described earlier has been selected, a check is made to determine from the calculated pitch angle whether the vehicle is in the ascent travel state with an ascent angle equal to or more than the preset angle.

Step S17: If the vehicle is not in the ascent travel state with an ascent angle equal to or more than the preset angle, it is then determined whether or not the vehicle is in the high-load forward drive state with a tractive force equal to or more than the specified value.

Figure 12:
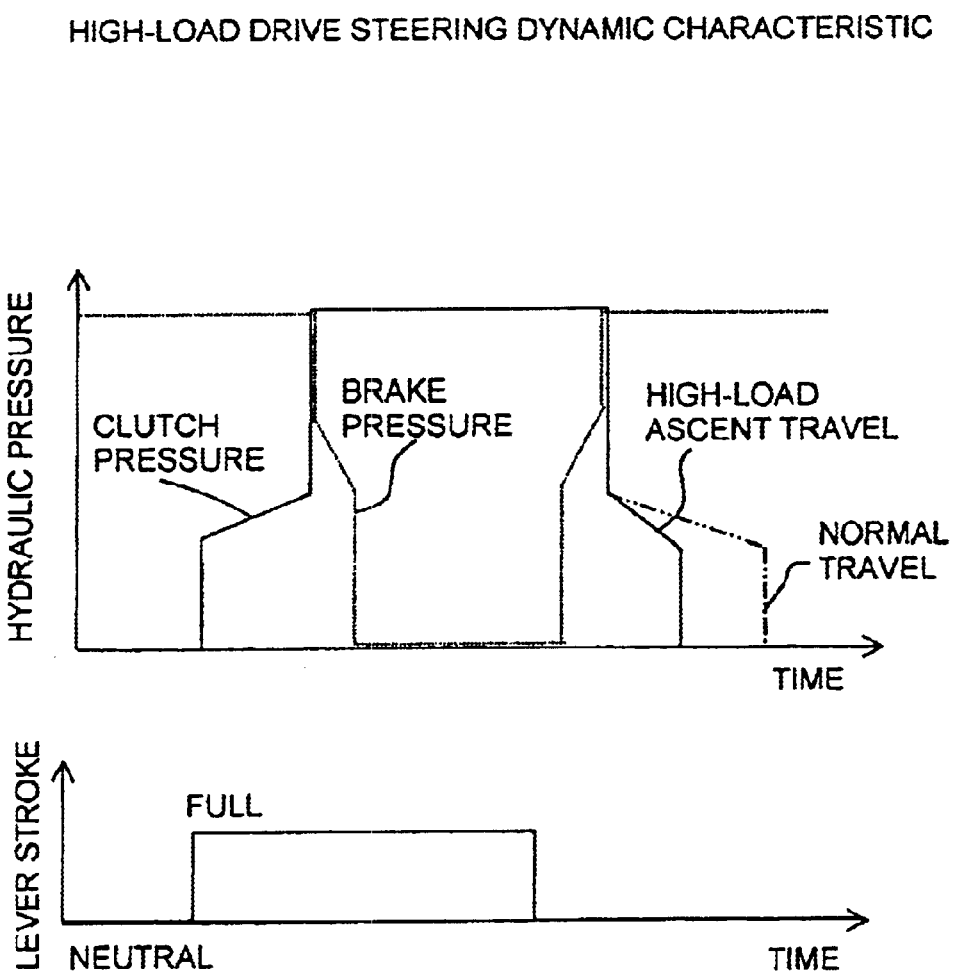
FIG. 12 is graphs showing steering hydraulic pressure dynamic characteristics for high-load drive.

Step S18: If the vehicle is in the ascent travel state with an ascent angle equal to or more than the preset angle or if the vehicle is in the high load forward drive state with a tractive force equal to or more than the specified value (i.e., dozing state), a high-load steering dynamic characteristic parameter is selected. More specifically, when the steering lever is shifted from its full stroke position to its neutral position, the time rate of change of clutch hydraulic pressure between a start of clutch engagement and completion of the clutch engagement is set to a value higher than that of the normal travel state(indicated by chain line) as shown in FIG. 12 and a hydraulic pressure characteristic which engages the clutch within a short time is selected. In this way, a smooth turning characteristic can be obtained which provides an uninterrupted supply of torque when the vehicle is in the high-load drive state, which prevents the reverse steering phenomenon when the vehicle is in the ascent travel state and which reduces shocks occurring when the state of the vehicle changes from the turning state to the straight-ahead drive state, while avoiding such an undesirable situation that the turning state continues, without being smoothly shifted to the straight-ahead drive state.

Step S19: If the vehicle is not in the ascent travel state with an ascent angle equal to or more than the preset angle nor in the high-load forward drive state with a tractive force equal to or more than the specified value, it is then determined from the calculated vehicle speed whether or not the vehicle is in a high-speed travel state.

Figure 13:
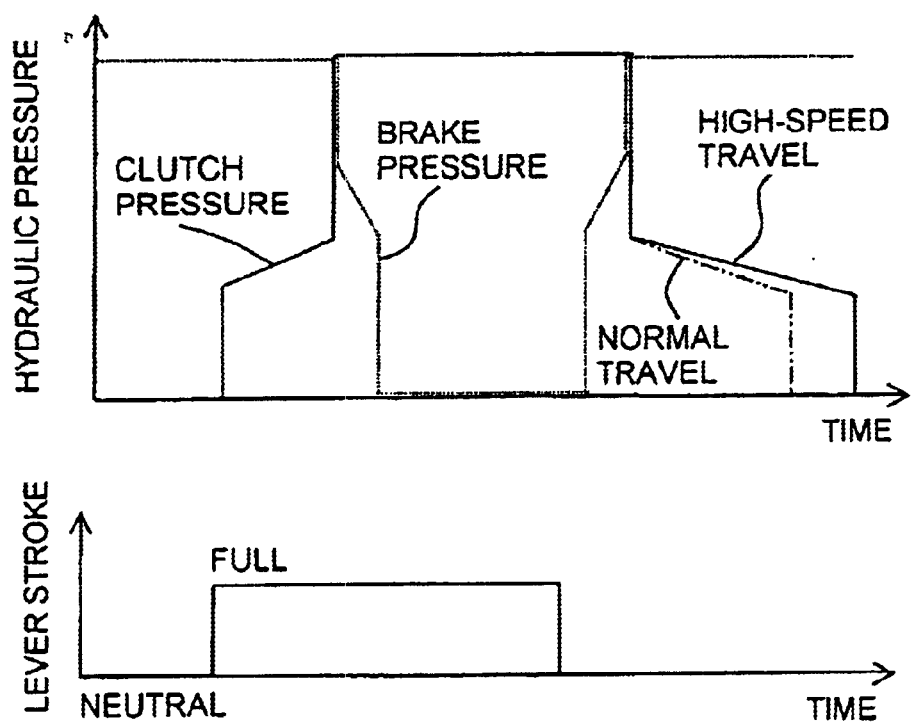
FIG. 13 is graphs showing steering hydraulic pressure dynamic characteristics for high-speed travel.

Step S20: If the vehicle is in the high-speed travel state, a high speed travel steering dynamic characteristic parameter is selected. More specifically, such a characteristic is selected that when the steering lever is shifted from its full stroke position to its neutral position, the time rate of change of clutch hydraulic pressure between a start of clutch engagement and completion of the clutch engagement is set to a value lower than that of the normal travel state(indicated by chain line) as shown in FIG. 13 and the clutch is gradually engaged. In this way, a smooth turning characteristic can be obtained which reduces shocks caused by the inertia of the vehicle when the state of the vehicle changes from the turning state to the straight-ahead drive state, while avoiding the above-described undesirable situation.

Step S21: If the vehicle is not in the ascent drive state with an ascent angle equal to or more than the preset angle, nor in the high-load forward drive state with a tractive force equal to or more than the specified value, nor in the high-speed travel state, a basic steering dynamic characteristic parameter for the normal travel state (indicated by two-dot chain line in FIGS. 12 and 13) is selected.

Steps S22 to S23: According to the above steering static characteristic or steering dynamic characteristic, clutch and brake hydraulic pressure in compliance with a steering lever stroke command is calculated and a hydraulic pressure command signal is output to the right and left clutches 26R, 26L and the right and left brakes 27R, 27L via the right and left clutch solenoid proportional control valves 30R, 30L and the right and left brake solenoid proportional control valves 31R, 31L, respectively. Thereafter, the program returns to Step S1.

As described earlier, in the present embodiment, the optimum steering static characteristic or steering dynamic characteristic is selected in accordance with the present mode selected from various operation modes such as a slope travel (i.e., ascent travel and descent travel), dozing operation, travel with low engine rotational speed, and high-speed travel. This enables a bulldozer which ensures steering performance free from steering shocks and fitting to the operator's feeling.

It will become apparent that the invention is not limited in its applications to the bulldozer described herein, but equally applicable to tracklaying vehicles of other types.

What is claimed is:

1. A steering control system for a tracklaying vehicle, which has a clutch and brake provided for each of right and left driving wheels, electronic proportional control valves for controlling the clutches and brakes, a steering lever, a steering command signal generator for generating a steering command signal according to the operation amount of the steering lever, and a controller for issuing a steering control signal to one of the electronic proportional control valves in response to an output from the steering command signal generator, which further comprises pitch angle detecting means for detecting the pitch angle of the vehicle inclining back and forth, and wherein if it is determined by the pitch angle detecting means that the vehicle is in an ascent travel state, the controller outputs a steering control signal to one of the electronic proportional control valves to obtain a hydraulic pressure characteristic which makes the range of a clutch holding zone wider than that employed when the vehicle is in a flat ground travel state.

2. A steering control system for a tracklaying vehicle according to claim 1, wherein if it is determined by the pitch angle detecting means that the vehicle is in its ascent travel state, the controller outputs a steering control signal to one of the electronic proportional control valves to obtain a hydraulic pressure characteristic which makes the lower limit of hydraulic pressure at the time of clutch disengagement lower than that employed when the vehicle is in the flat ground travel state.

3. A steering control system for a tracklaying vehicle according to claim 1 or 2, wherein a plurality of kinds of characteristic diagrams, each of which step-wise varies for every hydraulic pressure characteristic, are prepared and a desired characteristic diagram is selected from them.

4. A steering control system for a tracklaying vehicle, which has a clutch and brake provided for each of right and left driving wheels, electronic proportional control valves for controlling the clutches and brakes, a steering lever, a steering command signal generator for generating a steering command signal according to the operation amount of the steering lever, and a controller for issuing a steering control signal to one of the electronic proportional control valves in response to an output from the steering command signal generator, which further comprises tractive force detecting means for detecting the tractive force of the vehicle and pitch angle detecting means for detecting the pitch angle of the vehicle inclining back and forth, and wherein if it is determined by the tractive force detecting means and the pitch angle detecting means that the vehicle is not in a high-load drive state but in a descent travel state, the controller outputs a steering control signal to one of the electronic proportional control valves to obtain a hydraulic pressure characteristic which eliminates a zone in which a clutch and a brake are released at the same time and sets the upper limit of hydraulic pressure at the time of brake engagement to a first value, the first value being lower than the upper limit of hydraulic pressure when the vehicle is in a flat ground travel state.

5. A steering control system for a tracklaying vehicle according to claim 4, which further comprises rotation detecting means for detecting the rotation of an engine, and wherein if it is determined by the rotation detecting means that the engine is in its low rotational speed state, the controller outputs a steering control signal to one of the electronic proportional control valves to obtain a hydraulic pressure characteristic which sets the upper limit of hydraulic pressure at the time of brake engagement to a second value, the second value being lower than the upper limit of hydraulic pressure when the vehicle is in the flat ground travel state and higher than the first value.

6. A steering control system for a tracklaying vehicle according to claim 4 or 5, wherein a plurality of kinds of characteristic diagrams, each of which step-wise varies for every hydraulic pressure characteristic, are prepared and a desired characteristic diagram is selected from them.

7. A steering control system for a tracklaying vehicle, which has a clutch and brake provided for each of right and left driving wheels, electronic proportional control valves for controlling the clutches and brakes, a steering lever, a steering command signal generator for generating a steering command signal according to the operation amount of the steering lever, and a controller for issuing a steering control signal to one of the electronic proportional control valves in response to an output from the steering command signal generator, which further comprises speed range detecting means for detecting the speed range of a transmission, and wherein if it is determined by the speed range detecting means that the transmission is placed in a low speed range, the controller outputs a steering control signal to one of the electronic proportional control valves to obtain a hydraulic pressure characteristic which sets the rate of change of hydraulic pressure with respect to lever stroke when hydraulic pressure changes from its upper limit to its lower limit at the time of brake engagement to a low value.

8. A steering control system for a tracklaying vehicle according to claim 7, wherein the rate of change of hydraulic pressure is set to a low value by setting the lower limit of hydraulic pressure when the transmission is placed in a low speed range to a value higher than the low limit of hydraulic pressure when the transmission is in a high speed range.

9. A steering control system for a tracklaying vehicle according to claim 7 or 8, wherein a plurality of kinds of characteristic diagrams, each of which step-wise varies for every hydraulic pressure characteristic, are prepared and a desired characteristic diagram is selected from them.

* * * * *